Patented June 29, 1943

2,323,169

UNITED STATES PATENT OFFICE 2,323,169

PROCESS OF PLATING METAL BODIES

Edward R. Wagenhals, Summit, N. J., assignor to Radio Corporation of America, a corporation of Delaware No Drawing. Application February 8, 1940, Serial No. 317,902

4 Claims. (Cl. 117—22)

My invention relates to metal platings, particularly to the preparation of metal parts for welding.

Metal parts used in the fabrication of radio tubes, particularly parts that are heat treated in air, oxidize and corrode and cause difficulty in manufacture because of oxide layers on the metal parts that prevent good welds. The iron ring of a header for a commercial metal envelope tube as shown in the Rose Patent 2,066,856, January 5, 1937, for example, is covered with metal oxide particles when it is heated in air to make the glass-to-metal seal. Then before the ring can be welded to the envelope the header must be fired at a high temperature, often close to the glass softening temperature, to remove the oxide layer. Usually the header ring is joined to the rim of the envelope shell by pressing the ring against the rim and passing a current through the line of contact to make an annular gas-tight junction. The contact resistance and welding current must be uniform along the weld line and there must be a continuous and uniform fusion of the header and shell metal to make a gas-tight envelope. Non-uniformity in this weld, and air leaks, apparently are caused by small particles of high resistant iron oxide. Although the usual rust-proof platings reduce oxidation, clean-up firing cannot be eliminated.

An object of my invention is improved platings for metal parts for better welds.

Another object of my invention is improved methods of plating metal parts to prevent oxidation and corrosion, to eliminate cleaning operations and to improve welds.

I apply, according to my invention, a plating to metal parts to be welded to insure uniform gas-tight junctions at the weld. My improved plating insures uniform contact resistance and uniform distribution of welding current along a long welding contact line. As distinguished from the usual hard solders and rust-proof platings that on the surface are polished and smooth, and on which a minute particle of metal oxide may seriously disrupt distribution of welding current, my improved plating produces a slightly roughened surface. My improved plating not only insures uniform contact resistance for better welds but minimizes oxidation of the base metal.

One plating composition on a base metal that does not readily oxidize and will easily weld comprises particles of a refractory metal such as nickel bonded to the surface of the base metal with a film of a low welding temperature alloy or metal. The plating composition preferably comprises from 60% to 80% refractory metal particles, preferably of a particle size less than .001 inch and a low temperature bonding metal the remainder. Silver, copper, tin or zinc or alloys of these metals may be used to cover the base metal with a uniform air impervious film and to bond the refractory metal particles in place. I have found that silver is one of the better non-corroding plating metals but is expensive when used on a commercial scale. To reduce the amount of silver necessary for the impervious coating on the metal parts, I propose according to my invention to alloy the silver with a less expensive metal such as copper. One plating that has produced good results may be made by mixing powders of nickel, silver and copper with an organic binder, such as alcohol and butyl acetate containing about 2% nitrocotton, and coated on the base metal by spraying or dipping. When fired in hydrogen at 1100° C. for about five minutes, the copper and silver melt and alloy and spread evenly over the base metal and wet the nickel particles. At this temperature it is probable that only the surface of the nickel particles enters into solution with the lower melting temperature silver and copper. The resulting plating is well bonded to the base metal and in appearance under a microscope resembles a coating of sand held in place and covered with a thin film of glue. The proportion of bonding metal and the size of the refractory metal particles are so chosen that the thickness of the bonding film after melting and leveling is less than the average diameter of the particles so that the unmelted refractory particles above the film, or if completely wetted produce rounded bumps or knobs in the film. The spacing between particles and the depths to which the spaces are filled with the bonding metal may vary over wide limits. Good platings have been obtained with a nickel content of 60% to 80% and it is apparent more or less than these amounts may be used.

It is apparent, further, that any refractory metal that will not melt at the melting or alloying temperature of the binding metals may be used. Nickel with a melting temperature of 1450° C. or tungsten or molybdenum with higher melting points may be powdered and bonded to the base metal by various low temperature solders, such as silver and copper, or silver and tin. These alloys cover well and minimize oxidation of both the base metal and the plating. Good results have been obtained by mixing three metals in the proportions 60% to 80% nickel, 5% to 15% silver and the remainder copper. One good composition comprises 80% nickel, 10% copper and 10% silver. A firing temperature of 1100° C. is well above the melting temperature of both copper and silver and yet is sufficiently below the nickel melting temperature as not to melt or alloy an appreciable portion of the nickel. It is probable there is incipient fusion and alloying between the surfaces of the nickel particles and the bonding metal even at 1100° C.

Powdered oxides of the three metals are convenient to handle and when mixed and spread over the base metal may be fired in a reducing atmosphere to reduce the oxides to their metals and the firing continued at the necessary temperature and for the necessary time to melt and alloy the silver and copper. When two pieces of metal plated according to my invention are pressed together for welding, apparently the minute projections from the surface of the plating apparently increase the contact resistance between the two pieces so that for a given welding current more heat is generated and a better weld made. A particle of oxide or corrosion, that would electrically separate the welding surfaces of polished metal pieces and shunt welding current from a large area, causes little trouble in the weld of my improved plating since the particles of nickel in the plating extend beyond the oxide particles and make uniform electrical contact for welding.

Metal platings according to my invention will not oxidize or corrode easily, make good welds and are easy to manufacture.

I claim:

1. The process of plating a metal body to be welded to reduce corrosion and improve welding comprising coating the body with mixed particles of two metals having different melting points, the more refractory metal being predominant in the mixture, the proportion of low melting metal and the size of the refractory metal particles being so chosen that the thickness of the low melting metal after melting and levelling is less than the average diameter of the refractory particles, heating said body to a temperature intermediate the melting point of said two metals for sufficient time to completely melt the lower melting metal but for insufficient time to completely melt the higher melting metal.

2. The process of plating metal bodies to be welded to reduce corrosion comprising coating the bodies with a powdered mixture of the oxides of at least two metals having different melting temperatures, heating the coated metal body in a reducing atmosphere to reduce the oxide particles to metal particles and then firing the metal particles to their alloying temperature for sufficient time only to completely melt the lower melting metal.

3. The process of treating a metal body to reduce corrosion comprising coating the metal with mixed particles of nickel, copper and silver, the mixture of particles comprising 60 to 80% nickel, 5 to 15% silver and the remainder copper, and heating the coated metal to a temperature below nickel melting temperature and above the alloying temperature of copper and silver, said heating being continued only until said copper and silver are melted and alloyed.

4. The process of treating metal parts to reduce corrosion comprising coating said parts with mixed particles of silver, copper and nickel, the mixture comprising 80% nickel, 10% copper and 10% silver, heating the coating metal to the alloying temperature of copper and silver, said heating being for insufficient time to completely melt the nickel.

EDWARD R. WAGENHALS.